Jan. 4, 1949.  A. JOHNSON  2,458,080
CONVERTIBLE COASTER WAGON
Filed Jan. 17, 1946
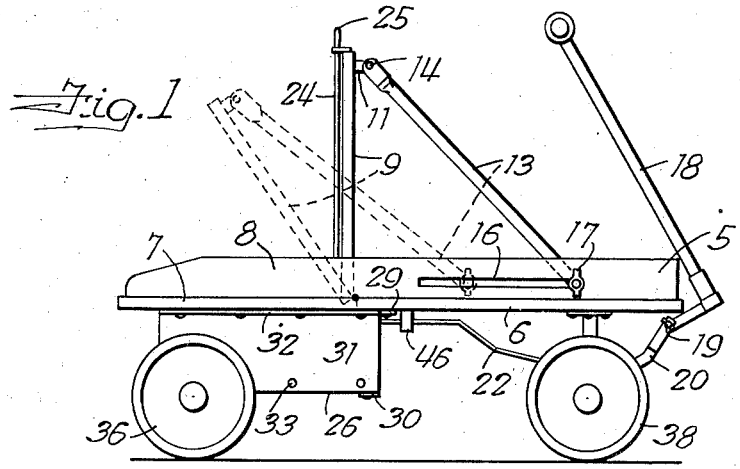
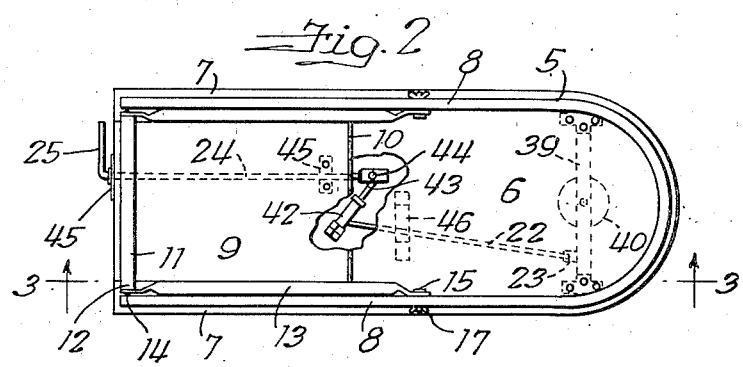
Inventor
Agnar Johnson
Andrew F. Wintercorn
atty.

Patented Jan. 4, 1949

2,458,080

UNITED STATES PATENT OFFICE 2,458,080

CONVERTIBLE COASTER WAGON

Agnar Johnson, Rockford, Ill.

Application January 17, 1946, Serial No. 641,740

16 Claims. (Cl. 280—87.01)

This invention relates to a new and improved convertible coaster wagon for children's use.

The principal object of my invention is to provide a coaster wagon in which the rear section of the bottom may be raised to a more or less upright position to form a back rest for a child seated in the front portion of the wagon box, and in which a platform is provided at a lower level over the rear axle on which another child may stand and propel the wagon with one foot like a scooter, the platform being used otherwise for various purposes, as for example, to carry a basket when shopping.

Another important object of my invention is to provide a convertible coaster wagon of the kind mentioned in which the raisable back rest may be easily adjusted to whatever angle the child may prefer at a given time, the supporting arms for the back rest forming side rests or guards of particular importance in the riding of little children and being designed to fold down with the back rest to an out-of-the-way position next to the sides of the wagon box when the coaster wagon is to be used as a conventional coaster wagon.

Another important object of the invention is to provide a convertible coaster wagon of the kind mentioned in which rear steering facilities connected with the front axle bolster permit steering of the wagon interchangeably from the front or rear, or both, the front axle bolster having the usual fork connected thereto on which the conventional handle is pivotally mounted. The rear steering mechanism is so designed that the manually rotatable shaft is rendered operative to oscillate the front bolster only when in raised position, this shaft being mounted on the bottom of the raisable back rest so as to be moved to operative position automatically when the back rest is raised.

The invention is illustrated in the accompanying drawings, in which:

Fig. 1 is a side view of a convertible coaster wagon made in accordance with my invention showing the back rest raised and indicating in dotted lines an adjusted position of the back rest;

Fig. 2 is a plan view of the wagon with the back rest lowered;

Fig. 3 is a longitudinal section on the line 3—3 of Fig. 2, and

Fig. 4 is a phantom perspective view to better illustrate the steering mechanism.

The same reference numerals are applied to corresponding parts in these four views.

The wagon box designated by the reference numeral 5 comprises a main front bottom section 6 which is generally U-shaped so that the rear side extensions 7 form supports for the rear portions of the side walls 8. 9 is a rear bottom section which I refer to as a "back rest" because it is hinged at its front edge as indicated at 10 to the rear of the main front section 6 between the side extensions 7 and is arranged to be raised to a more or less upright position as shown in Fig. 1 to serve as a back rest for a child seated in the front portion of the wagon box. A rear cross-piece 11 on the top of the back rest 9 has its opposite end portions 12 projecting from opposite sides of the back rest to rest on top of the extensions 7 for support of the back rest 9 in coplanar relation to the rest of the bottom 6 when the back rest is lowered as shown in Fig. 2. This rear cross-piece serves the same as a tail gate for the wagon box except that it is not designed to swing downwardly, but is rigid with the piece 9. The cross-piece 11 has two arms or rods 13 pivotally connected to the end portions 12 as indicated at 14 and has bolts 15 extending outwardly from their front ends and slidable in slots 16 provided in the side walls 8 of the wagon box whereby to permit clamping the back rest in any desired position of adjustment between the horizontal position shown in Fig. 2 and the vertical position in full lines in Fig. 1, as, for example, is indicated in dotted lines in Fig. 1, wing nuts 17 being threaded on the outer ends of the bolts 15 and tightenable against the outer side of the wagon box to fasten the front ends of the arms 13 at any selected position with respect to the slots 16. Children are fond of adjusting a thing like the back rest 9 to all sorts of positions and this feature alone will account for a large percentage of the child's enjoyment of this convertible coaster wagon. It moreover makes the wagon usable by a child from a rather tender age because the parent can seat the youngster in the front portion of the wagon box when the back rest is raised and can give the youngster a ride without fear of it falling out. The arms 13 form side rests or guards which the youngster can use as grab rails or to which the parent, if so desired, can fasten the child as when seated in a high chair. The arms 13 fold down with the back rest 9 and are out of sight and out of the way next to the sides of the wagon box under those conditions so that there is nothing to interfere with the use of the wagon as any conventional coaster wagon.

The handle 18 which is pivotally and preferably detachably connected at 19 to the fork 20 on the front axle bolster 21 is used either to pull the wagon in the usual way or to steer it when a child riding in the wagon on one knee propels it with one foot in the usual way. Disconnection of the handle is permissible with this wagon because, as will soon appear, the front bolster 21 is operable interchangeably from the rear of the wagon by means of a link 22 pivotally connected at 23 and operable by a shaft 24 equipped with a right angle handle portion 25 on the outer end thereof.

When the back rest 9 is raised, a horizontal platform 26 of approximately the same width and length as the back rest is exposed and made available for use by another child who may stand on the platform and take hold of the raised back rest 9 for support, as for example, when the wagon is being pulled by a third party by means of the handle 18. This enables a parent to ride two children, one in front and the other in back, without either interfering with the other's enjoyment of the ride, because an older child will be far better satisfied to ride standing on the platform 26 than being seated in the wagon box, and, of course, the younger child is best able to ride in the wagon box using the back rest for support and the arms 13 for guards or grab rails. The platform 26, however, is also intended to be used by an older child when propelling the wagon with one foot, the same as a scooter, and under those conditions the other child seated in the front may steer the wagon with the handle 18, or the steering control may be taken over at the rear, using the handle 25, or there may be both front and rear steering. The platform 26 may on occasion be used also to carry things while a child is riding in front, as for example, in shopping, when a basket containing the groceries or other articles purchased may be carried on the platform 26 without interfering in any way with the enjoyment of the child riding in front. The large variety of ways of operating the wagon not only accommodates children of widely varying ages, but adds to the enjoyment, general convenience and utility of the wagon all around. The platform 26 is supported at the rear end on top of the rear axle 27 and at its front end by a sheet metal plate 28 that has a forwardly extending flange 29 on the upper end fastened in any suitable way to the bottom 6 and a rearwardly extending flange 30 on the lower end suitably secured to the platform 26. Side plates 31 have outwardly projecting flanges 32 on their upper ends fastened to the bottom of the extensions 7 and are secured at their lower ends to the sides of the platform 26, as by screws 33. In that way, the platform 26 is enclosed on three sides, and a child can therefore tuck things into this space under the wagon bottom when he is using the wagon as an ordinary coaster wagon. A removable or hinged closure may be provided for the rear end of the box formed by the platform 26 and plates 28 and 31, and if hinged, will be provided preferably on the rear end of the platform 26 to swing down like a tail gate on a wagon box, as indicated in dotted lines at 34 in Fig. 3, and any suitable side supporting means like that indicated in dotted lines at 35 will be provided for the tail gate member and provision made for detachably securing said member in a raised closed position so as to permit carrying articles on the platform when the wagon is used as a conventional coaster wagon, without danger of such articles falling out. If desired, a fixed rear cross-piece may be provided on the platform 26 more or less to close the back of the box for which the platform forms the bottom. A narrow piece would be enough to prevent things drifting off the platform and on the other hand would not interfere with the handy use of the platform for the other purposes described. A child enjoys having such an auxiliary compartment where things may be carried without interfering with the free use of the wagon box as on the ordinary conventional coaster wagon. The rear wheels 36 are, of course, disposed on opposite sides of the platform 26 and carried on the opposite ends of the axle 27.

The front axle 37, on which the front wheels 38 are mounted, is carried on the bolster 21 and this bolster is arranged to turn with respect to another bolster 39 on the usual turntable 40. Link 22, which, as previously stated, has pivotal connection 23 at its front end to the bolster 21, has a pivotal connection 41 with a sleeve 42 rotatable on a steering arm 43 that is pivotally connected at 44 to the inner end of the shaft 24. The shaft 24 is mounted in suitable bearings 45 on the bottom of the back rest 9, and when the back rest is in a horizontal position, the axis of the pivotal connection 44 is vertical as indicated in Fig. 2, and hence, under these conditions, there is no interference whatsoever with the free oscillation of the steering arm 43 relative to the inner end of the shaft 24, as required for the free steering of the front wheels by means of the handle 18. On the other hand, when the back rest 9 is raised, the pivot 44 is substantially horizontal as in Fig. 4, and under those conditions, the front wheels can be steered by turning the shaft 24 with the handle 25, because the arm 43 then oscillates with the shaft 24. If desired, the handle 25 may be eliminated and a steering wheel provided instead. The U-strap 46 fastened to the bottom of the wagon box slidably supports the rear end portion of the link 22 and thereby keeps the steering arm 43 in the proper closely spaced relation to the bottom of the wagon box at all times. The shaft 24 is suitably shouldered at its outer end next to the handle 25 so that it will not slide endwise in the bearings 45 under gravity when the back rest 9 is raised. The flattened and thereby enlarged inner end where the pivot 44 is provided prevents endwise movement of the shaft 24 in the other direction.

It is believed the foregoing description conveys a good understanding of the objects and advantages of my invention. The appended claims have been drawn to cover all legitimate modifications and adaptations.

I claim:

1. A child's convertible wagon comprising a bottom for a wagon box supported on wheels, said bottom consisting of a main front section having two rearwardly extending laterally spaced side portions, and a rear section hinged at its front edge to the rear edge of the front section between said side portions, said box including upstanding side walls supported on said main front section, and a pair of arms disposed on opposite sides of said rear section and arranged to overlie the rearwardly extending side portions inside the wagon box, said arms being pivotally connected at their rear ends to the opposite sides of the rear section at points in rearwardly spaced relation to its hinged front edge portion and being slidably pivotally connected at their front ends to the wagon box and having means for fastening said front ends to said box in any one of a plurality of adjusted positions, whereby said rear section is usable as an adjustable back rest and said arms as side rests and grab rails.

2. A child's convertible wagon comprising a bottom for a wagon box supported on wheels, said bottom consisting of a main front section having two rearwardly extending laterally spaced side portions, and a rear section hinged at its front edge to the rear edge of the front section between said side portions, a pair of arms disposed on opposite sides of said rear section and arranged to overlie the rearwardly extending side portions of the front section for support in the lowered position of the rear section, said arms extending between and adjustably connected at their opposite ends to the front and rear sections to support the rear section in any one of a plurality of adjusted raised positions, and means on the rear end portion of the rear section arranged to overlie the rearwardly extending side portions of the main section for support of said rear section on the main section in lowered position.

3. A wagon as set forth in claim 1 including a cross-piece on the rear end portion of the rear section, the opposite ends of which are arranged to overlie the rearwardly extending side portions of the main section for support of the rear section on the main section in lowered position, the arms being pivotally connected at their rear ends to the ends of said cross-piece.

4. A child's convertible wagon comprising a bottom for a wagon box supported on wheels, said bottom consisting of a main front section having two rearwardly extending laterally spaced portions, and a rear section hinged at its front edge to the rear edge of the front section between said side portions, means for supporting said rear section either in a lowered position as a part of the bottom or in a raised position as a back rest, and a platform spaced below the rear section of said bottom in such depressed relation to the bottom that the top of the raised rear section is substantially at the right height for a child standing on the platform to hold onto said rear section for support while riding standing on the platform.

5. A child's convertible wagon comprising a bottom for a wagon box supported on wheels, said bottom consisting of a main front section having two rearwardly extending laterally spaced portions, and a rear section hinged at its front edge to the rear edge of the front section between said side portions, means for supporting said rear section either in a lowered position as a part of the bottom or in a raised position as a back rest, a platform spaced below the rear section of said bottom in such depressed relation to the bottom that the top of the raised rear section is substantially at the right height for a child standing on the platform to hold onto said rear section for support while riding standing on the platform, and vertical walls enclosing said platform and extending between the platform and bottom to form with said platform a box beneath the wagon box.

6. A child's convertible wagon comprising a bottom for a wagon box supported on wheels, said bottom consisting of a main front section having two rearwardly extending laterally spaced portions, and a rear section hinged at its front edge to the rear edge of the front section between said side portions, means for supporting said rear section either in a lowered position as a part of the bottom or in a raised position as a back rest, a platform spaced below the rear section of said bottom in such depressed relation to the bottom that the top of the raised rear section is substantially at the right height for a child standing on the platform to hold onto said rear section for support while riding standing on the platform, a front steering means for said wagon, and an auxiliary rear steering means operable when the rear section is raised.

7. A child's convertible wagon comprising a bottom for a wagon box supported on wheels, said bottom consisting of a main front section having two rearwardly extending laterally spaced portions, and a rear section hinged at its front edge to the rear edge of the front section between said side portions, means for supporting said rear section either in a lowered position as a part of the bottom or in a raised position as a back rest, a platform spaced below the rear section of said bottom, fixed side and front walls extending between the bottom and platform and forming with said platform a box below the wagon box open at its rear, and openable rear closure means for said lower box.

8. A child's convertible coaster wagon comprising a wagon box having a bottom supported on wheels, said bottom including a rear section raisable to a back rest position relative to the rest of the bottom, and a passenger platform spaced below the rear section and disposed in rigid relation to the wagon box, said platform being in such depressed relation to the bottom that the top of the raised rear section is substantially at the right height for a child standing on the platform to hold onto said rear section for support while riding standing on the platform.

9. A child's convertible coaster wagon comprising a wagon box having a bottom supported on wheels, said bottom including a rear section raisable to a back rest position relative to the rest of the bottom, and an auxiliary box below the rear section in rigid relation to the first named wagon box and covered by said rear section in the lowered position thereof, said auxiliary box including a bottom adapted to serve as a passenger platform, which is in such depressed relation to the first-mentioned bottom that the top of the raised rear section is substantially at the right height for a child standing on said box bottom to hold onto said rear section for support while riding standing on said box bottom.

10. A child's convertible wagon comprising a bottom for a wagon box supported on wheels, said bottom consisting of a main front section having two rearwardly extending laterally spaced portions, and a rear section hinged at its front edge to the rear edge of the front section between said side portions, means for supporting said rear section either in a lowered position as a part of the bottom or in a raised position as a back rest, a platform spaced below the rear section of said bottom, front steering means including an oscillatable front steering member, and rear steering means comprising a link pivotally attached to said front member and extending rearwardly toward said platform, a steering arm in transverse relation to said link, means swivelled on one end of arm and having a pivotal connection with the rear end of said link, and a manually oscillatable steering shaft mounted on and raisable with said rear section and pivotally connected to the other end of said steering arm, the pivotal axis of the latter connection being substantially vertical in the lowered position of said rear section, whereby to permit idle oscillation of said steering arm relative to said steering shaft in the oscillatory movement of said front member with front steering, said pivotal axis being substantially horizontal in the raised position of said rear section, whereby to permit oscillation of said steering arm with said steering shaft.

11. In a convertible vehicle steerable selectively from either end, the combination of an oscillatable front steering member, manually operable front steering means connected therewith for operating the same, a steering link pivotally attached to said front steering member and extending rearwardly therefrom to a rear steering station, a steering arm in transverse relation to the rear end of said link, means swivelled on one end of said arm and having a pivotal connection with the rear end of said link, and a manually rotatable steering shaft movable from an inoperative substantially horizontal position to an operative upright position and pivotally connected on an axis transversely of the steering shaft with the other end of said steering arm, said axis being substantially vertical in the lowered position of said steering shaft whereby to permit idle oscillation of said steering arm relative to said shaft.

12. In a vehicle steering mechanism, the combination of a steering link movable substantially horizontally, a steering arm in transverse relation to one end of said link, means swivelled on one end of said arm and having a pivotal connection with the end of said link, a steering shaft movable from an inoperative substantially horizontal position to an operative upright position and pivotally connected on an axis transversely of the steering shaft with the other end of said steering arm, said axis being substantially vertical in the lowered position of said steering shaft whereby to permit idle oscillation of said steering arm relative to said shaft.

13. A child's convertible coaster wagon comprising a bottom for a wagon box supported on front and rear pairs of wheels, the front pair of wheels being on a pivoted bolster for steering, said bottom including a rear section raisable to a back rest position relative to the rest of the bottom, a passenger platform below the rear section in rigid relation to the wagon box, a steering link pivotally attached to said bolster and extending rearwardly therefrom, and steering means on said rear section conncted with said link in such a way as to permit raising and lowering movement of said rear section relative to said link.

14. A wagon as set forth in claim 13 including a handle pivotally attached to said front bolster for pulling and steering said wagon.

15. A child's coaster wagon comprising a bottom for a wagon box supported on front and rear pairs of wheels, the front pair of wheels being on a pivoted bolster for steering, said bottom having an upwardly projecting back rest at the rear thereof, a passenger platform below the level of said bottom behind said back rest, a steering link pivotally attached to said bolster and extending rearwardly therefrom, and a steering shaft on said back rest connected with said link.

16. A wagon as set forth in claim 15 including a handle pivotally attached to said front bolster for pulling and steering said wagon.

AGNAR JOHNSON.

REFERENCES CITED

The following references are of record in the file of this patent:

UNITED STATES PATENTS

| Number | Name | Date |
|---|---|---|
| 1,318,847 | Clockers | Oct. 14, 1919 |
| 1,482,506 | Bradford | Feb. 5, 1924 |
| 1,663,729 | Ragenovic | Mar. 27, 1928 |
| 1,771,813 | Norman | July 29, 1930 |
| 1,773,567 | Bradley | Aug. 19, 1930 |
| 1,791,391 | Townsend et al. | Feb. 3, 1931 |
| 2,040,005 | Kister | May 5, 1936 |

FOREIGN PATENTS

| Number | Country | Date |
|---|---|---|
| 25,512 | Great Britain | Oct. 29, 1914 |